(12) United States Patent
Abe

(10) Patent No.: US 7,334,812 B2
(45) Date of Patent: *Feb. 26, 2008

(54) AIRBAG AND AIRBAG SYSTEM

(75) Inventor: Kazuhiro Abe, Berlin (DE)

(73) Assignee: Takata Corporation (JP)

( * ) Notice: Subject to any disclaimer, the term of this patent is extended or adjusted under 35 U.S.C. 154(b) by 343 days.

This patent is subject to a terminal disclaimer.

(21) Appl. No.: 11/075,162

(22) Filed: Mar. 8, 2005

(65) Prior Publication Data
US 2005/0194769 A1 Sep. 8, 2005

(30) Foreign Application Priority Data

| Mar. 8, 2004 | (JP) | 2004-064554 |
|---|---|---|
| Sep. 7, 2004 | (JP) | 2004-259943 |
| Nov. 4, 2004 | (JP) | 2004-320852 |
| Feb. 28, 2005 | (JP) | 2005-053671 |

(51) Int. Cl.
B60R 21/16 (2006.01)

(52) U.S. Cl. ................... 280/729; 280/743.1
(58) Field of Classification Search ............ 280/729, 280/731, 740, 742, 743.1
See application file for complete search history.

(56) References Cited

U.S. PATENT DOCUMENTS

| 5,165,716 A | 11/1992 | Imai et al. |
|---|---|---|
| 5,249,824 A | 10/1993 | Swann et al. |
| 5,253,892 A | 10/1993 | Satoh |
| 5,464,250 A | 11/1995 | Sato |
| 5,607,183 A | 3/1997 | Nishimura et al. |
| 6,086,092 A | 7/2000 | Hill |
| 6,254,121 B1 | 7/2001 | Fowler et al. |
| 6,419,267 B1 | 7/2002 | Hashimoto et al. |
| 6,834,884 B2 * | 12/2004 | Gu .............. 280/729 |
| 6,866,291 B2 | 3/2005 | Abe et al. |
| 7,111,866 B2 * | 9/2006 | Abe et al. .............. 280/729 |
| 2003/0020264 A1 | 1/2003 | Abe et al. |

(Continued)

FOREIGN PATENT DOCUMENTS

EP 1044855 10/2000

(Continued)

OTHER PUBLICATIONS

European Search Report, Application No. EP 05 00 4696. 0-1523, Jun. 21, 2005, 3 pages.

Primary Examiner—Paul N. Dickson
Assistant Examiner—Drew J. Brown
(74) Attorney, Agent, or Firm—Fitch, Even, Tabin & Flannery

(57) ABSTRACT

To speed up the inflation of a second chamber of an airbag that is portioned into a first chamber including an inflator and the second chamber enclosing the first chamber and to facilitate the design of adjusting the shape and thickness of the inflated airbag, an airbag and airbag system are disclosed. In one form, the airbag includes therein first and second inner panels to partition the interior of the airbag into a first chamber and a second chamber that encloses the first chamber. The second inner panel has communication holes for communicating the first chamber and the second chamber with each other. The outer peripheries of the inner panels are joined together with a seam. A jet of gas emitted from gas ports of the inflator is supplied directly into the second chamber through the communication holes.

11 Claims, 12 Drawing Sheets

U.S. PATENT DOCUMENTS

| | | |
|---|---|---|
| 2003/0034637 A1 | 2/2003 | Wang et al. |
| 2004/0145162 A1* | 7/2004 | Abe et al. .................. 280/729 |
| 2006/0091649 A1* | 5/2006 | Kumagai et al. .......... 280/729 |
| 2006/0131846 A1* | 6/2006 | Abe ........................... 280/729 |
| 2006/0138752 A1* | 6/2006 | Kumagai et al. .......... 280/729 |
| 2006/0138753 A1* | 6/2006 | Kumagai et al. .......... 280/729 |
| 2006/0151976 A1* | 7/2006 | Abe ........................... 280/729 |
| 2006/0175819 A1* | 8/2006 | Abe ........................ 280/743.2 |
| 2006/0237953 A1* | 10/2006 | Abe ........................... 280/729 |
| 2007/0024043 A1* | 2/2007 | Abe ........................ 280/743.2 |
| 2007/0045997 A1* | 3/2007 | Abe et al. .................. 280/729 |

FOREIGN PATENT DOCUMENTS

| | | |
|---|---|---|
| EP | 1279566 | 1/2003 |
| JP | 61-182353 U | 11/1986 |
| JP | 01247242 A | 10/1989 |
| JP | 01311930 A | 12/1989 |
| JP | 5-13656 Y2 | 4/1993 |
| JP | 05178146 A | 7/1993 |
| JP | 07232607 A | 9/1995 |
| JP | 3022480 U | 3/1996 |
| JP | 09315246 A | 12/1997 |
| JP | 2002308039 A * | 10/2002 |
| JP | 2004-114915 | 4/2004 |

* cited by examiner

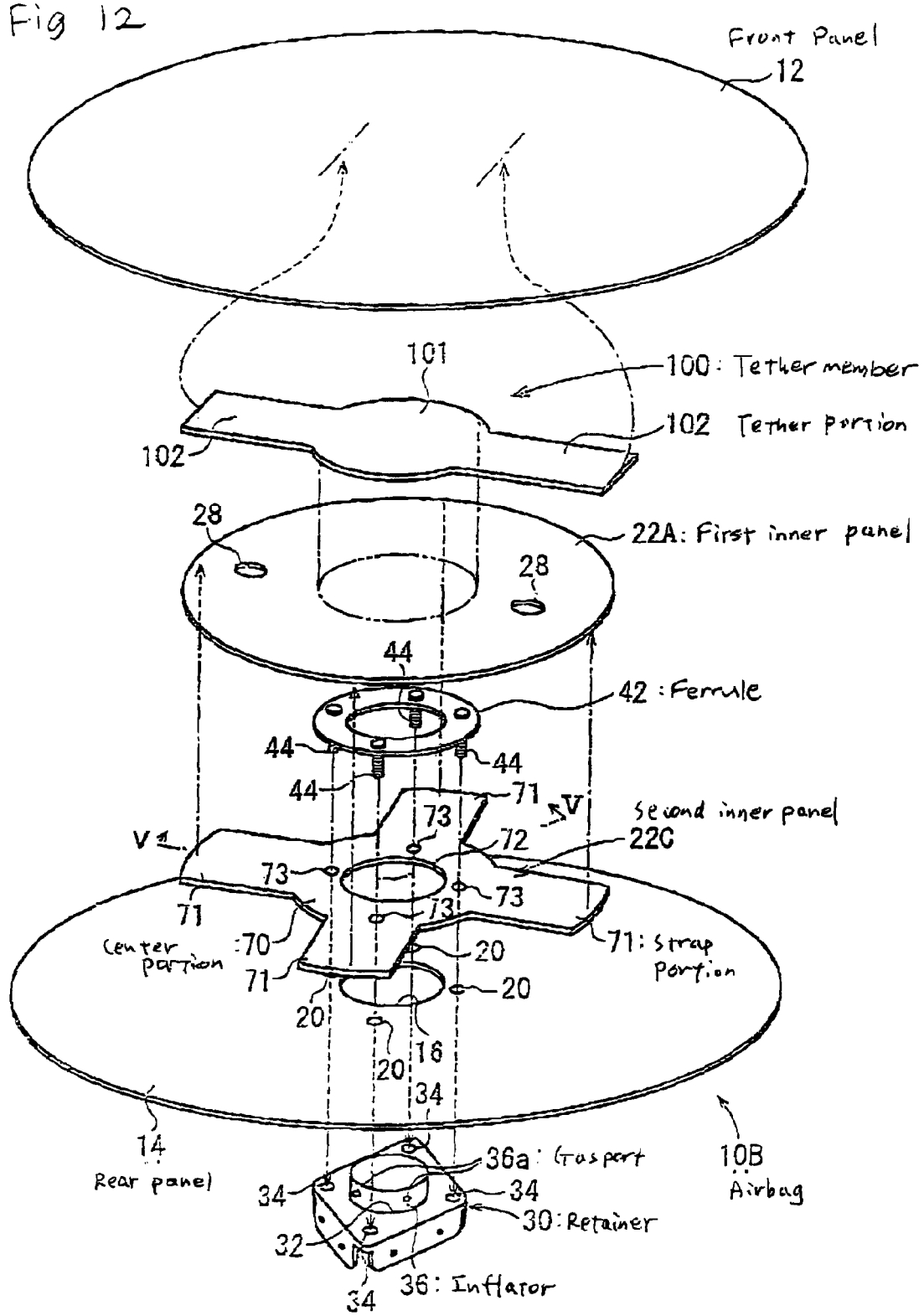

AIRBAG AND AIRBAG SYSTEM

FIELD OF THE INVENTION

The present invention relates to an airbag mounted to high-speed movable units such as vehicles, for protecting human bodies by inflating in an emergency such as a crash.

BACKGROUND OF THE INVENTION

Various airbag systems such as driver-seat airbag systems have been used to protect occupants in case of an emergency such as a car crash. Driver-seat airbag systems include an airbag formed by sewing the peripheries of a front panel adjacent to the occupant and an opposite rear panel together. The rear panel has an inflator-engaging opening for receiving the end of an inflator in the center. The periphery of the opening is fixed to a retainer with bolts, pins, or rivets. The rear panel also has a vent hole for releasing gas in the airbag to absorb the impact when a driver-seat occupant strikes against the airbag.

It is described in Japanese Unexamined Patent Application Publication No. 1-311930 to provide an airbag having an inner panel (referred to as an inner airbag in this reference) between the inflator opening of the rear panel and the front panel to partition the interior of the airbag into a central first chamber and a peripheral second chamber. The inner airbag has a communication hole for communicating the first chamber and the second chamber with each other. Upon activation of the inflator, the first chamber inflates first and then the second chamber inflates.

SUMMARY OF THE INVENTION

Accordingly, it is an object of the present invention to speed up the inflation of a second chamber of an airbag of which the interior is divided into a first chamber and the second chamber and to facilitate the design of adjusting the shape and thickness of the airbag in an inflated state.

An airbag according to a preferred form is inflated by gas from a gas generator. The airbag includes a front panel disposed on the occupant side and a rear panel disposed opposite to the occupant, the peripheries of the front panel and the rear panel being connected with each other. The rear panel has an opening for the gas generator in the center. The airbag also has an inner panel for partitioning the interior of the airbag into a central first chamber and a second chamber enclosing the first chamber. The inner panel has an opening in the center, the opening centered at the identical point with the opening of the rear panel. The periphery of the inner panel adjacent to the end is connected with a midpoint between the center and the periphery of the front panel. The inner panel includes a first inner panel adjacent to the front panel and a second inner panel adjacent to the rear panel. The rear end of the first inner panel is connected to the front end of the second inner panel. The second inner panel has communicating portions for communicating the first chamber and the second chamber with each other. The communicating portions are disposed on the extension of the gas-emitting direction of the gas generator, with the airbag in an inflated state.

In the airbag according to one embodiment, the rear panel has a vent hole and the inner panel has an inner vent hole for communicating the first chamber and the second chamber with each other.

The airbag according to another embodiment, has the first inner panel connected to the front panel via a tether member.

The airbag according to yet another embodiment, includes an airbag and a gas generator including a gas port. At least the end of the gas generator is disposed in the airbag and the gas port is disposed in the airbag. The airbag can take the forms of any of the earlier-described airbags. The communicating portions are disposed on the extension of the gas-emitting direction of the gas generator, with the airbag in an inflated state.

The airbag system of another embodiment, includes an airbag and a gas generator having a gas port. At least the end of the gas generator is disposed in the airbag and the gas port is disposed in the airbag. The airbag includes a front panel disposed on the occupant side and a rear panel disposed opposite to the occupant, the peripheries of the front panel and the rear panel being connected with each other. The rear panel has an opening for the gas generator in the center. An inner panel is disposed for partitioning the interior of the airbag into a central first chamber and a second chamber enclosing the first chamber. The inner panel has an opening in the center, the opening centered at the identical point with the opening of the rear panel. The periphery of the inner panel adjacent to the end is connected with a midpoint between the center and the periphery of the front panel. The inner panel has communicating portions for communicating the first chamber and the second chamber with each other. The first chamber includes a guide member for guiding the gas from the gas generator toward the communicating portions.

In the airbag system according to one form, the guide member includes a gas receiving chamber for receiving the gas from the gas generator and a gas discharge opening for discharging the gas in the gas receiving chamber into the first chamber. The communicating portions are disposed on the extension of the gas discharging direction of the gas discharge opening, with the airbag in an inflated state.

In the airbag system according to another form, the airbag and the gas generator are mounted to a retainer; and the guide member encloses the end of the gas generator and is mounted to the retainer with a mounting member common to the gas generator.

In the airbag system according to one form, the guide member is a partitioning inner panel for partitioning the first chamber into a small chamber adjacent to the gas generator and a large chamber adjacent to the front panel. The partitioning inner panel has discharging portions for discharging the gas from the small chamber to the large chamber, and the communicating portions faces the small chamber.

In the airbag system according to one form, the partitioning inner panel is connected to the second inner panel.

In the airbag system according to another form, the rear panel has a vent hole; and the inner panel has an inner vent hole for communicating the first chamber and the second chamber with each other.

In the airbag system according to one form, the first inner panel is connected to the front panel via a tether member.

In the airbag and the airbag system according to other forms, the communicating portions for communicating the first chamber and the second chamber in the airbag is disposed on the extension of the gas-emitting direction of the gas generator disposed in the first chamber via the respective gas-generator openings of the rear panel and the inner panel, or to face the gas ports of the gas generator. Accordingly, upon activation of the gas generator, a jet of gas is emitted from the gas ports toward the communicating portions. Thus, the gas from the gas generator is also supplied directly into the second chamber through the communicating portions. Thus, the second chamber inflates early.

In the case of the airbag, the inner panel is constructed of a connected body of a first inner panel of the front panel and a second inner panel of a rear panel. This facilitates the design of adjusting the thickness and shape of the airbag by adjusting the size of the first inner panel.

In the airbag according to one form, the rear panel has vent holes; and the inner panel has inner vent holes for communicating the first chamber and the second chamber with each other. Accordingly, when a human body strikes against the inflated airbag, the gas in the first chamber and the second chamber can be released through the inner vent holes and the vent holes, thereby allowing the impact to be absorbed.

In the airbag according to another form, the first inner panel is connected to the front panel via a tether member. This further facilitates the adjustment of the thickness of the airbag by adjusting the length of the tether member.

In the airbag system according to one form, the gas from the gas generator is guided by the guide member toward the communicating portions for the first chamber and the second chamber. Accordingly, the gas from the gas generator is also supplied directly into the second chamber through the communicating portions. Thus the second chamber inflates early.

In another form, the guide member includes a gas receiving chamber for receiving the gas from the gas generator and a gas discharge opening for discharging the gas in the gas receiving chamber into the first chamber. Thus, the gas from the gas generator can be guided toward the communicating portions irrespective whether or not the communicating portions are disposed on the extension of the gas discharging direction of the gas discharge opening, with the airbag in an inflated state.

When the airbag and the gas generator are mounted to a retainer and when the guide member encloses the end of the gas generator and is mounted to the retainer with a mounting member common to the gas generator, the guide member can be firmly fixed to the retainer together with the gas generator. Thus, the mounting member can be used in common, thereby reducing the cost and the number of mounting steps.

When the first chamber is partitioned by the partitioning inner panel into a small chamber adjacent to the gas generator and a large chamber adjacent to the front panel, when the partitioning inner panel has a discharging portion for discharging the gas from the small chamber into the large chamber, and when the communicating portion for communicating the first chamber and the second chamber together is disposed to face the small chamber, the gas from the gas generator is first introduced into the small chamber and then distributed into the large chamber and the second chamber through the gas discharge portion and the communicating portions, respectively. Thus, both of the first chamber and the second chamber inflate early.

In that case, it is preferable that the partitioning inner panel be connected to the second inner panel. With such a structure, the rear end of the second inner panel is hardened early with the inflation of the small chamber, thus stabilizing the position of the inner panel.

When the rear panel has a vent hole; and the inner panel has an inner vent hole for communicating the first chamber and the second chamber with each other, the gas in the first chamber and the second chamber can be released through the inner vent hole and the vent hole to absorb the impact when a human body strikes against the inflated airbag.

When the first inner panel is connected to the front panel via a tether member, the adjustment of the thickness of the airbag is facilitated by adjusting the length of the tether member.

BRIEF DESCRIPTION OF THE DRAWINGS

FIG. 6(*b*) is an exploded perspective view of the first and second inner panels.

FIG. 12 is an exploded perspective view of an airbag and airbag system in FIG. 11.

DETAILED DESCRIPTION OF THE PREFERRED EMBODIMENTS

Embodiments of the present invention will be described hereinbelow with reference to the drawings.

Figure 1:
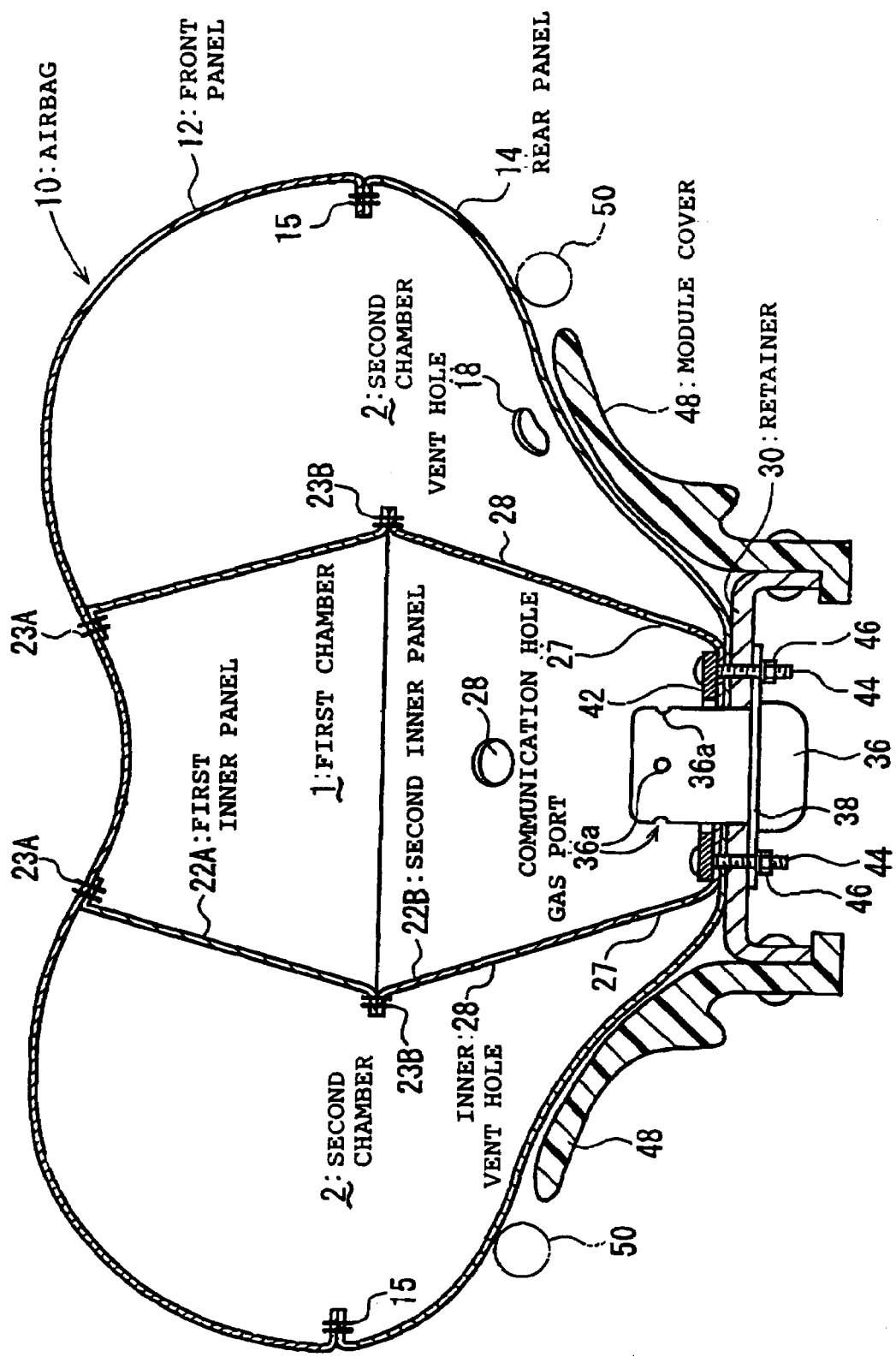
FIG. 1 is a cross sectional view of an airbag and an airbag system according to an embodiment of the present invention.
Figure 2:
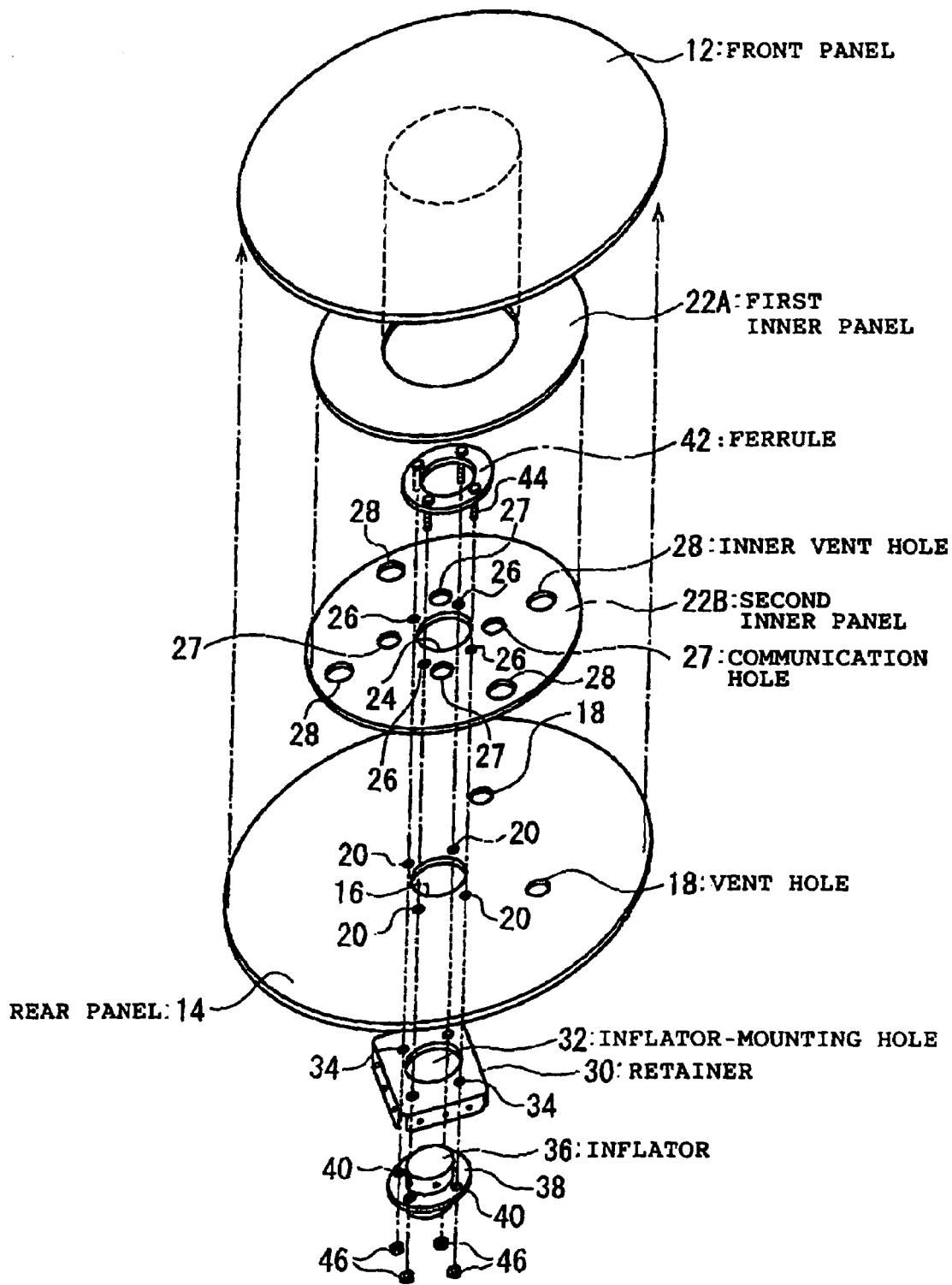
FIG. 2 is an exploded perspective view of the airbag and the airbag system of FIG. 1.

FIG. 1 is a cross sectional view of an automotive driver-seat airbag and airbag system according to an embodiment. FIG. 2 is an exploded perspective view of the airbag and the airbag system.

The airbag 10 includes a front panel 12, a rear panel 14, a first inner panel 22A, and a second inner panel 22B, which are each made of a circular woven fabric. The front panel 12 and the rear panel 14 have an equal diameter, of which the outer peripheries are stitched together into a bag shape with a seam 15 such as thread. The stitched portion has a ring shape along the outer peripheries of the front panel 12 and the rear panel 14.

The rear panel 14 has an inflator (gas generator) opening 16 and vent holes 18. The inflator opening 16 is disposed in the center of the rear panel 14. Around the inflator opening 16, bolt-insertion holes 20 are provided.

The airbag 10 includes the first inner panel 22A and the second inner panel 22B therein. The first and second inner panel 22A and 22B are centered at the identical point with the front panel 12 and the rear panel 14, of which the outer peripheries are stitched together with a seam 23B such as thread. The inner periphery of the first inner panel 22A adjacent to the front panel 12 (the periphery of the first inner panel 22A adjacent to the end, with the airbag 10 in an inflated state) is sewn on the midpoint between the center and the periphery of the front panel 12 with a seam 23A such as thread.

The center of the second inner panel 22B adjacent to the rear panel 14 (the portion of the second inner panel 22B adjacent to the rear end thereof, with the airbag 10 in an inflated state) has an inflator opening 24 centered at the identical point with the inflator opening 16 of the rear panel 14. The openings 16 and 24 have substantially an equal diameter. Around the opening 24 of the second inner panel 22B, bolt-insertion holes 26, which agree with the bolt-insertion holes 20 of the rear panel 14, are provided.

The second inner panel 22B has inner vent holes 28 closer to the outer periphery and communication holes 27 closer to the inner periphery for communicating the first chamber 1 and the second chamber 2 with each other. The inner vent holes 28 may also be provided in the first inner panel 22A.

The periphery of the inflator opening 24 of the second inner panel is superposed on the periphery of the inflator opening 16 of the rear panel 14 and on the periphery of an inflator-mounting hole 32 of a retainer 30. The peripheries of the inflator openings 24 and 16 are fixed to the retainer 30 through the bolt-insertion holes 26 and 20, respectively. Thus the periphery of the inflator opening 24 of the second inner panel 22B connects to the periphery of the inflator opening 16 of the rear panel 14; the outer peripheries of the first and second inner panels 22A and 22B connect with each other; and the inner periphery of the first inner panel 22A connects with the front panel 12.

The first and second inner panels 22A and 22B partition the interior of the airbag 10 into a central first chamber 1 and a second chamber 2 around the first chamber 1. The first chamber 1 is inside the inner panels 22A and 22B.

The communication holes 27 are provided on the extension of the gas emitting direction of an inflator 36, to be described later, which is disposed in the first chamber 1 through the inflator openings 16 and 24, or at the position facing gas ports 36a of the inflator 36.

As shown in FIG. 2, this embodiment includes four communication holes 27 and four inner vent holes 28 at equal intervals in the circumferential direction of the airbag 10. The communication holes 27 and the inner vent holes 28 are circumferentially out of phase relative to the center of the airbag 10.

Reinforcing patches may be attached to the peripheries of the openings 16 and 24, the communication holes 27, and the vent holes 18 and 28.

The retainer 30 for mounting the airbag 10 has the inflator-mounting hole 32 in the center, around which bolt-insertion holes 34 are provided.

The inflator 36 is substantially cylindrical and has the gas ports 36a around the side circumference at the axial end. This embodiment includes four gas ports 36a at equal intervals in the circumferential direction of the inflator 36. The inflator 36 emits a jet of gas radially from the gas ports 36a. A flange 38 for fixing the inflator 36 projects from the side circumference of the axial middle of the inflator 36 (close to the rear end relative to the gas ports 36a). The flange 38 has bolt-insertion holes 40. The end of the inflator 36 is fitted in the inflator-mounting hole 32 of the retainer 30.

To mount the airbag 10 to the retainer 30, the peripheries of the respective inflator openings 16 and 24 of the rear panel 14 and the second inner panel 22B are retained to the periphery of the inflator-mounting hole 32 of the retainer 30 with a ferrule 42. The end of the inflator 36 fitted in the inflator-mounting hole 32 is inserted into the first chamber 1 through the inflator openings 16 and 24. The gas ports 36a at the end of the inflator 36 face the communication holes 27 of the second inner panel 22B.

At that time, stud bolts 44 of the ferrule 42 are inserted into the bolt-insertion holes 26, 20, 34, and 40, to the ends of which nuts 46 are fastened, so that the second inner panel 22B, the airbag 10, and the inflator 36 are fixed to the retainer 30. The airbag 10 is then folded. A module cover 48 is fixed to the retainer 30 such that it covers the folded airbag 10. Thus the airbag system is constructed. The airbag system is mounted to an automotive steering wheel (only a rim 50 is shown in FIG. 1).

In case of a car crash, the inflator 36 is activated to emit a jet of gas into the airbag 10. The airbag 10 is inflated by the gas, opening the module cover 48 to deploy in the vehicle cabin, thereby protecting the driver-seat occupant.

The airbag 10 is constructed such that the communication holes 27, which communicate the first chamber 1 and the second chamber 2 together, are disposed on the extension of the gas-emitting direction of the inflator 36 disposed in the first chamber 1, or to face the gas ports 36a of the inflator 36. Accordingly, upon activation of the inflator 36, gas is ejected from the inflator 36 to the communication holes 27. Thus the gas from the inflator 36 is also supplied directly into the second chamber 2 through the communication holes 27, as shown in FIG. 1, so that the second chamber 2 inflates early.

When the occupant strikes against the inflated airbag 10, the gas in the first chamber 1 and the second chamber 2 flows out through the inner vent holes 28 and the vent holes 18, thereby absorbing the impact.

Figure 3:
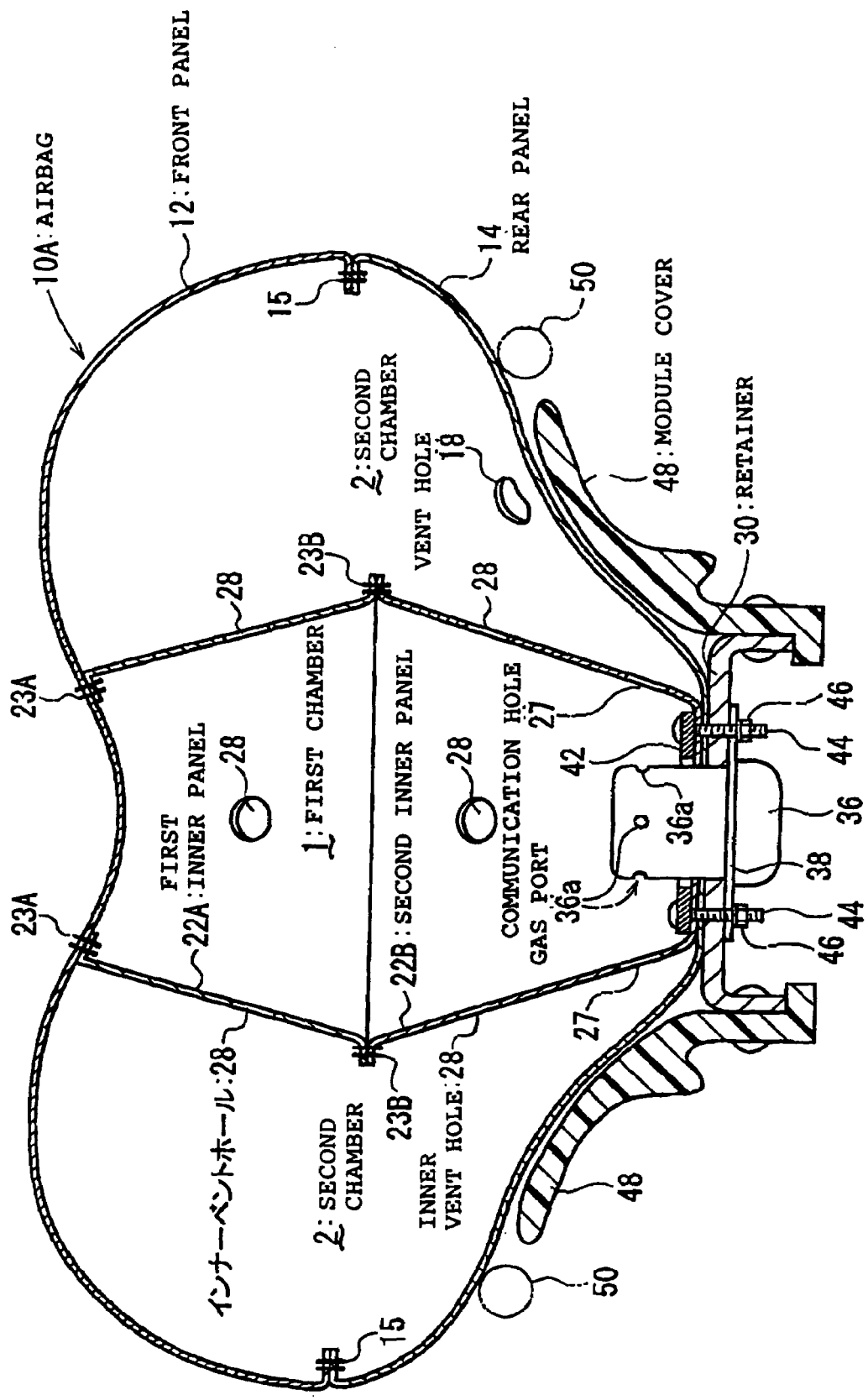
FIG. 3 is a cross sectional view of an airbag and an airbag system according to another embodiment.

The foregoing embodiment is only an example of the invention; the invention is not limited to the embodiment. For example, in the above embodiment, the inner vent holes 28 are provided in the second inner panel 22B. However, the inner vent holes 28 may be provided in the first inner panel 22A. Alternatively, as in an airbag 10A of FIG. 3, the inner vent holes 28 may be provided in both of the first inner panel 22A and the second inner panel 22B. The other structures of the airbag 10A are the same as those of the airbag 10 in FIGS. 1 and 2.

Although the above embodiment includes four gas ports 36a and four communication holes 27, the number is not limited to four. Although the communication holes 27 are disposed on the extension of the gas-emitting direction of all of the gas ports 36a of the inflator 36, the communication holes 27 may be disposed only on the extension of the gas-emitting direction of part of the gas ports 36a. Alternatively, there may be communication holes disposed off the extension of the gas ports 36a so that they do not face the gas ports 36a.

The shape of the communication holes 27 may be other than that in the drawing. The area of the opening of the communication holes 27 is selected depending on the internal volume of the second chamber 2, so that there is no particular limit. Also the shape of the panels may be other than that in the drawing.

Figure 4:
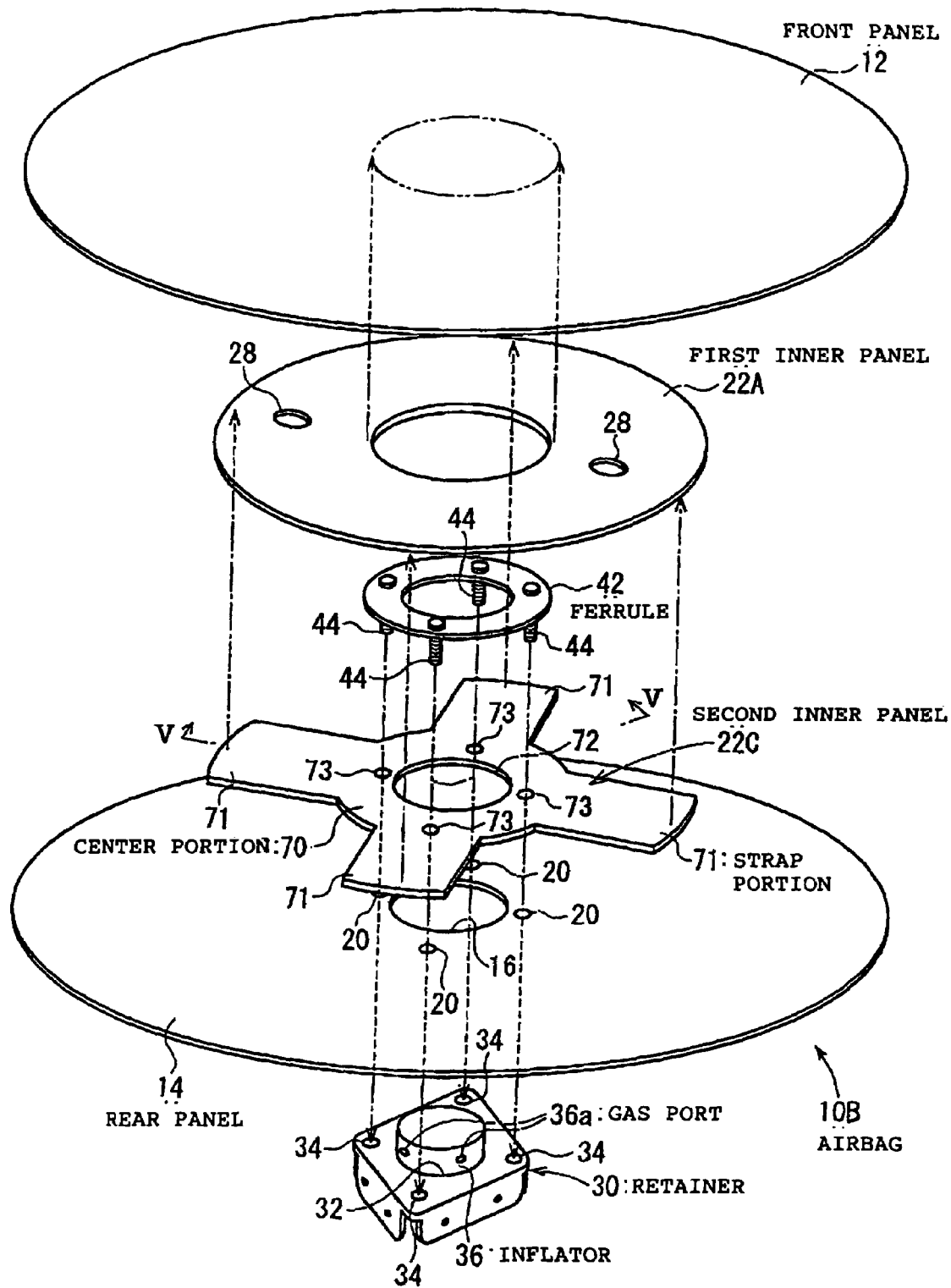
FIG. 4 is an exploded perspective view of an airbag and an airbag system according to still another embodiment.
Figure 5:
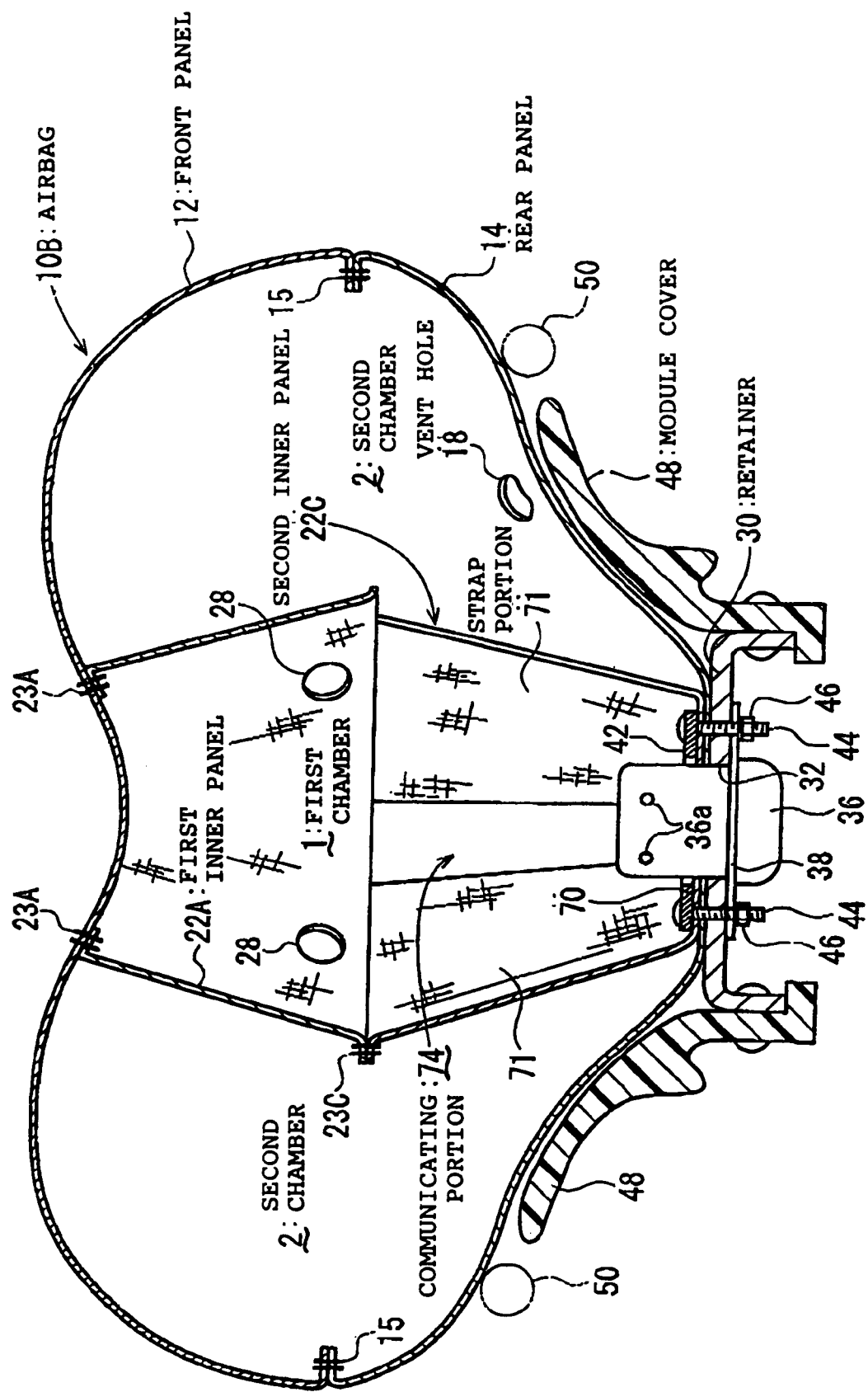
FIG. 5 is a cross sectional view taken along line V-V of FIG. 4.

FIG. 4 is an exploded perspective view of an airbag 10B and an airbag system according to another embodiment. FIG. 5 is a cross sectional view taken along line V-V of FIG. 4.

Also the airbag 10B includes the front panel 12 and the rear panel 14, which construct the outer shell, and the first inner panel 22A and a second inner panel 22C for partitioning the interior of the airbag 10B into the central first chamber 1 and the peripheral second chamber 2. The second inner panel 22C in this embodiment includes a ring-shaped center portion 70, which is interposed on the periphery of the inflator opening 16 of the rear panel 14, and four strap portions 71 projecting radially from the outer periphery of the center portion 70. The strap portions 71 are spaced equidistantly around the center portion 70. Bolt-insertion holes 73 are provided around a center opening (inflator opening) 72 of the center portion 70, for the stud bolts 44 of the ferrule 42 to pass through.

The front panel 12, the rear panel 14, and the first inner panel 22A are circular also in this embodiment. The peripheries of the front panel 12 and the rear panel 14 are stitched together with the seam 15. The inner periphery of the first inner panel 22A is sewn on the midpoint between the center and the periphery of the front panel 12 with a seam 23A. In this embodiment, the inner vent holes 28 are provided in the first inner panel 22A.

The center portion 70 of the second inner panel 22C is centered at the identical point with the first inner panel 22A. The end of each strap portion 71 is sewn on the outer periphery of the first inner panel 22A with a seam 23C. The ends of the strap portions 71 are spaced equidistantly around the first inner panel 22A. For the airbag 10B, the clearances between the strap portions 71 serve as communicating portions 74 for communicating the first chamber 1 and the second chamber 2 together.

The center portion 70 of the second inner panel 22C is superposed on the periphery of the inflator opening 16 of the rear panel 14 and fixed to the periphery of the inflator-mounting hole 32 of the retainer 30 with the ferrule 42. The end (gas ejecting portion) of the inflator 36 fitted in the inflator-mounting hole 32 is inserted into the first chamber 1 through the inflator openings 16 and 72. Also in this embodiment, four gas ports 36a are disposed equidistantly around the side circumference at end of the inflator 36. The gas ports 36a face the communicating portions 74.

The other structures of the airbag 10B and an airbag system including the airbag 10B are the same as those of the embodiment in FIGS. 1 and 2. The same reference numerals in FIGS. 4 and 5 as those of FIGS. 1 and 2 denote the same components.

Also in the case of the airbag 10B, the gas ports 36a of the inflator 36 disposed in the first chamber 1 face the communicating portions 74 that communicate the first chamber 1 and the second chamber 2 with each other. Accordingly, upon activation of the inflator 36, a jet of gas is emitted from the gas ports 36a toward the communicating portions 74. The gas from the inflator 36 is therefore supplied directly also to the second chamber 2 through the communicating portions 74. Thus the second chamber 2 inflates early.

In the case of the airbag 10B, the second inner panel 22C is made of a cross-shaped woven fabric including the center portion 70 which lies on the periphery of the inflator opening 16 of the rear panel 14 and the four strap portions 71 extending radially from the center portion 70. Accordingly, the entire area is smaller than that made of a circular fabric. This reduces the usage of the fabric for the panel to reduce material cost, thus resulting in resource saving.

The number of the strap portions 71 is not necessarily four but is selected as appropriate depending on the number of the gas ports of the inflator 36.

Figure 6A:
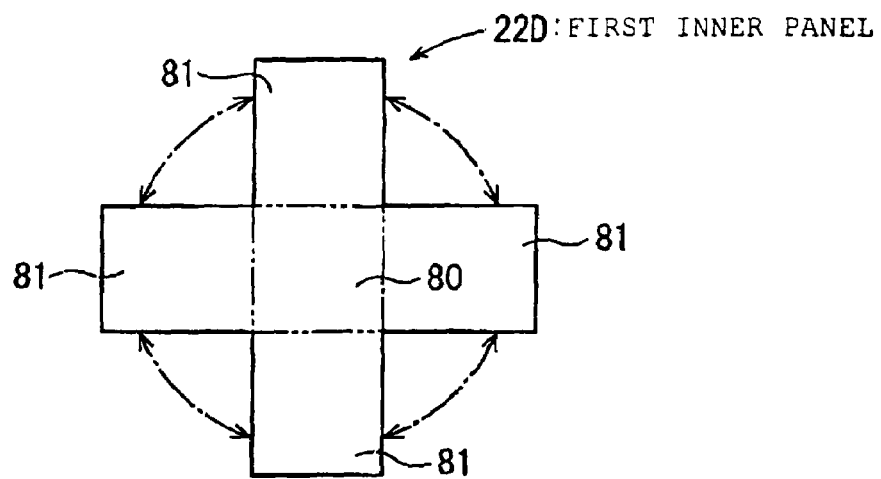
FIG. 6(*a*) is a plan view of a first inner panel with another structure.
Figure 6B:
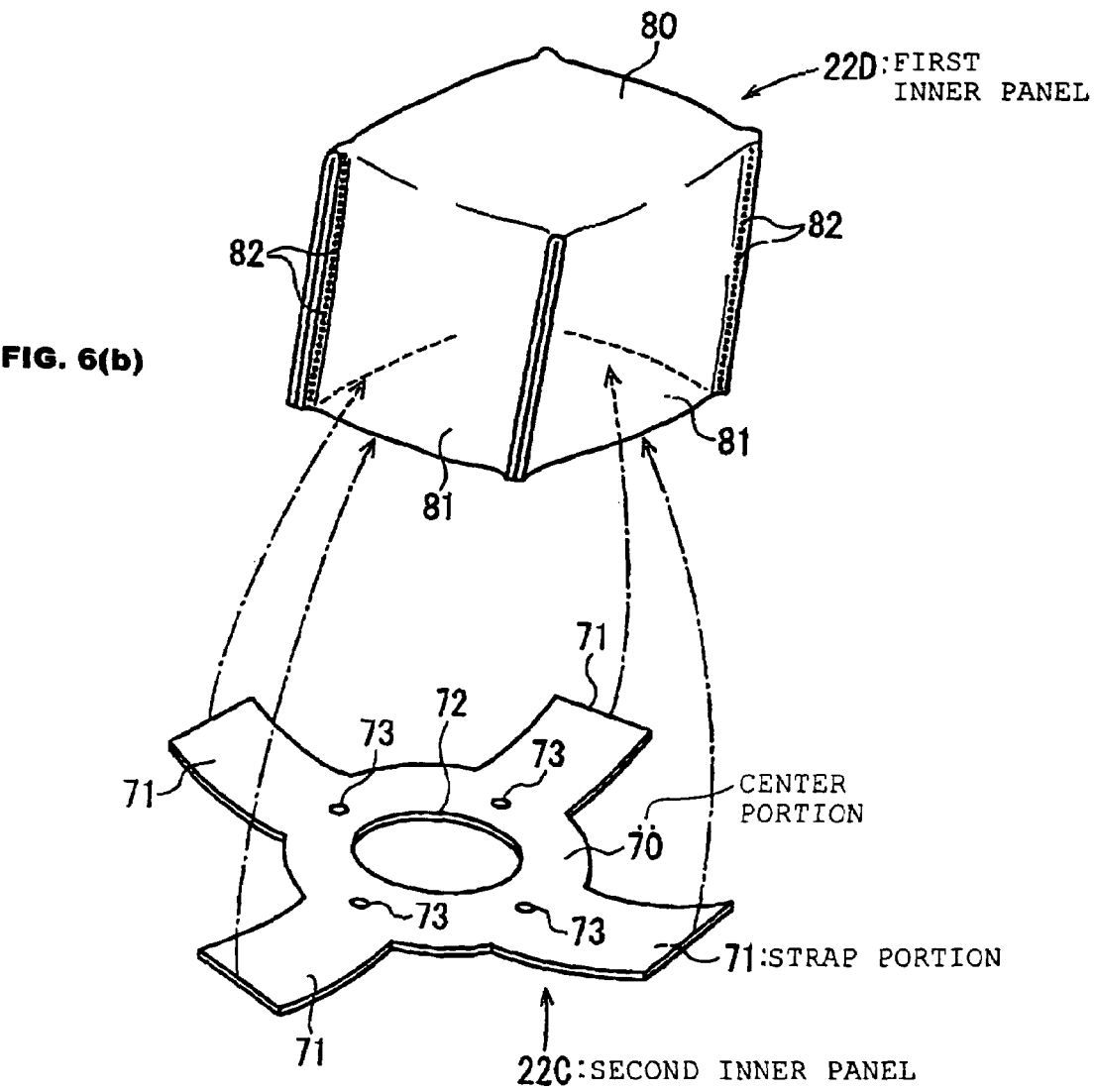

The first inner panel of the invention may not necessarily be circular. FIG. 6(a) is a plan view of a first inner panel according to another embodiment. FIG. 6(b) is an exploded perspective view of the first inner panel and a second inner panel.

The first inner panel 22D of this embodiment is made of a cross-shaped woven fabric including a center portion 80 which is connected to a front panel (not shown) and four strap portions 81 extending radially from the center portion 80. The fabric is formed into a bottomless bag, shown in FIG. 6(b), by folding the strap portions 81 from the base toward a rear panel (not shown) and stitching the sides of the adjacent strap portions 81 together. Reference numeral 82 denotes the seam of the stitch. The space inside the bag-shaped first inner panel 22D serves as a first chamber.

In this embodiment, as shown in FIG. 6(b), the ends of the strap portions 71 of the second inner panel 22C are sewn on the peripheries at the ends of the strap portions 81. The second inner panel 22C is the same as that of the embodiment in FIGS. 4 and 5.

Also the first inner panel 22D is made of a cross-shaped woven fabric including the center portion 80 and the four strap portions 81 extending radially from the center portion 80. Accordingly, the entire area is smaller than that made of a circular fabric. This reduces the usage of the fabric for the panel to reduce material cost, thus resulting in resource saving.

The number of the strap portions 81 is not necessarily four but may be three or more than five.

Figure 7:
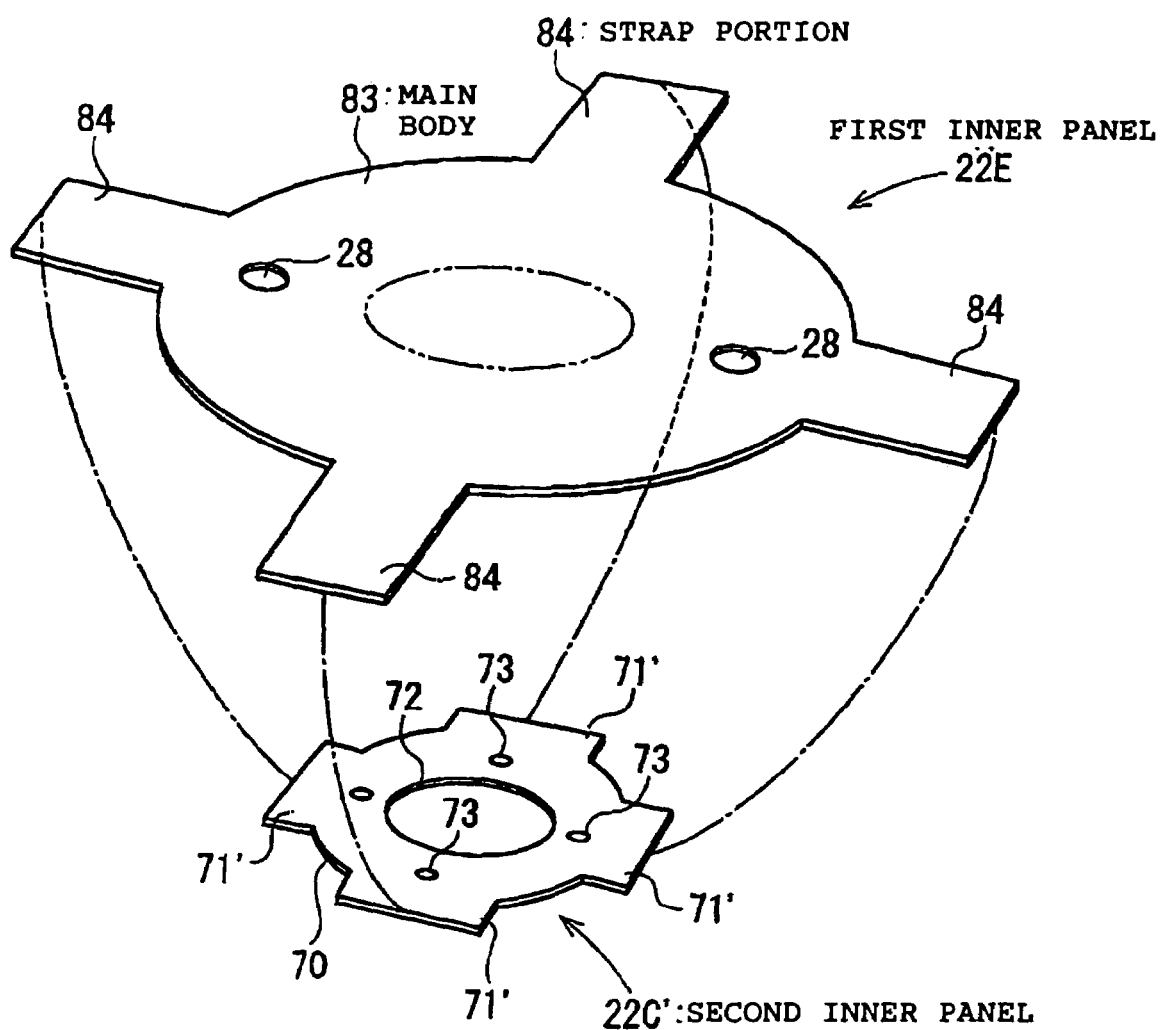
FIG. 7 is an exploded perspective view of first and second inner panels with still another structure.

In the invention, the communicating portion for communicating the first chamber and the second chamber together may be provided across the first chamber 1 and the second chamber 2. FIG. 7 is an exploded perspective view of a first inner panel 22E and a second inner panel 22C' with such a structure.

The first inner panel 22E of this embodiment includes a circular main body 83 whose center portion is connected with a front panel (not shown) and four strap portions 84 projecting radially from the outer periphery of the main body 83. The strap portions 84 are spaced equidistantly around the main body 83. The alternate long and two short dashed line around the center portion of the main body 83 indicates a stitch line for connecting the center portion of the main body 83 and the front panel. The inner vent holes 28 are provided in the vicinity of the midpoint between the center and the outer periphery of the main body 83.

Also in this embodiment, the second inner panel 22C' includes the ring-shaped center portion 70 superposed on the periphery of the inflator opening of a rear panel (not shown) and four strap portions 71' projecting radially from the outer periphery of the center portion 70. The strap portions 71' are spaced equidistantly around the center portion 70. The strap portions 71' of this embodiment are shorter than the strap portions 71 of the embodiment in FIGS. 4 to 6.

In this embodiment, the strap portions 84 of the first inner panel 22E and the strap portions 71' of the second inner panel 22C' are joined together by stitching or the like, so that the clearances between the joined strap portions 71' and 84 serve as communicating portions for communicating the first chamber and the second chamber together.

In the invention, the first chamber may have a guide member for guiding the gas from the inflator into the communicating portions (openings).

Figure 8:
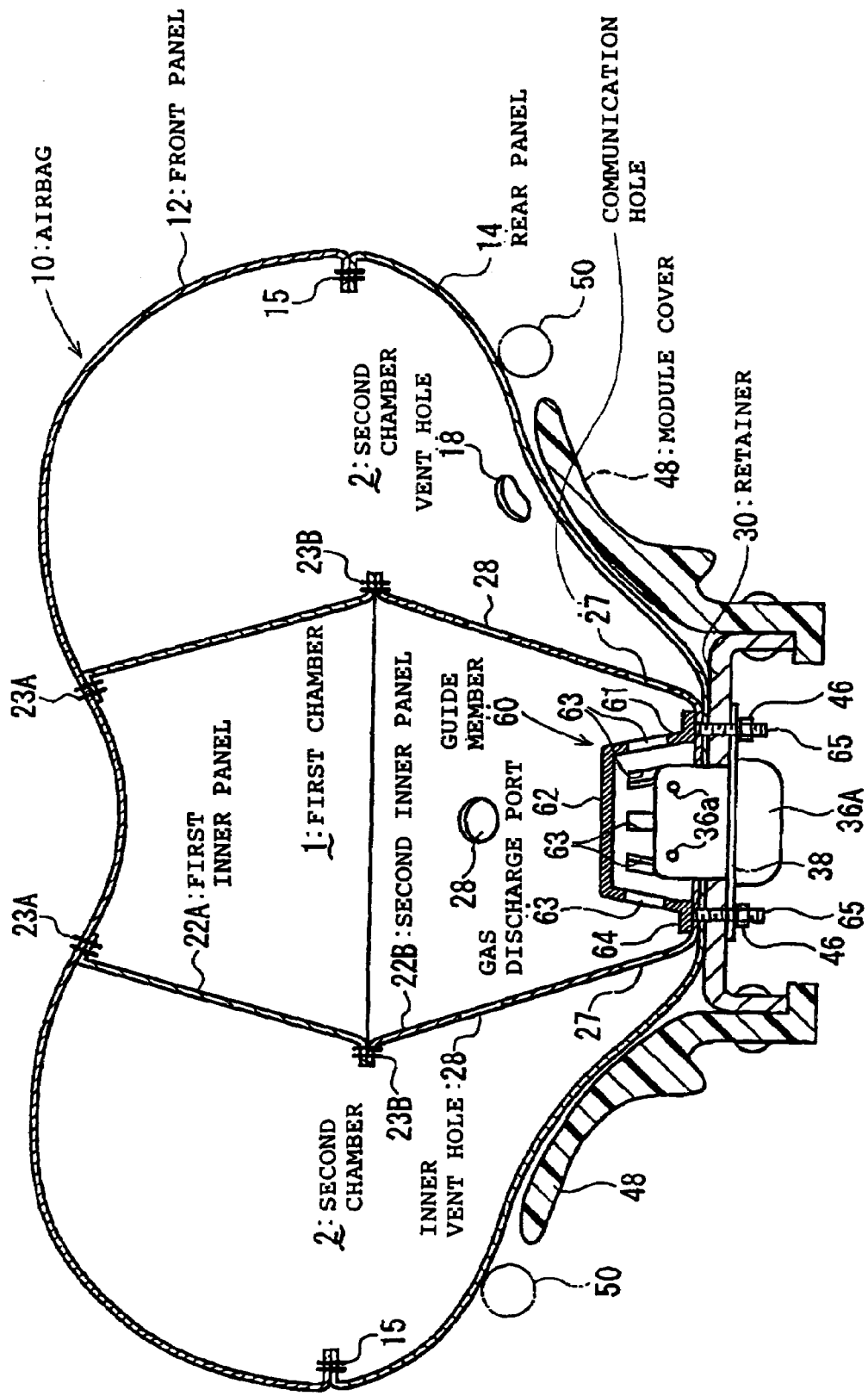
FIG. 8 is a cross sectional view of an airbag system according to another embodiment.
Figure 9:
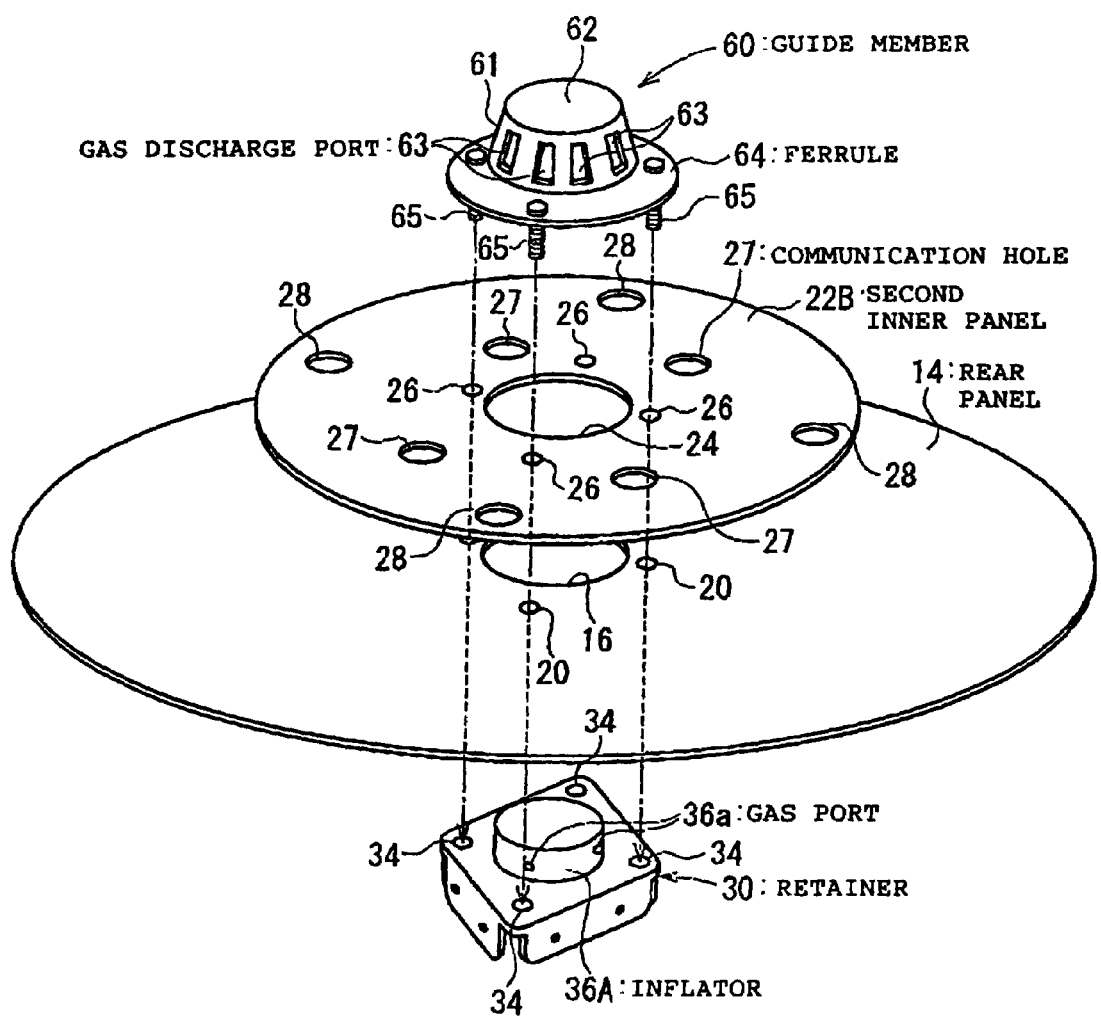
FIG. 9 is an exploded perspective view of the essential parts of the airbag system in FIG. 8.

FIG. 8 is a cross sectional view of an airbag system, showing an example of the guide member. FIG. 9 is an exploded perspective view of the essential parts of the airbag system.

In this embodiment, the first chamber 1 of the airbag 10 includes a guide member 60 for guiding gas from an inflator 36A into the communication holes 27 for the first chamber 1 and the second chamber 2. The airbag 10 is the same as the airbag 10 of FIGS. 1 and 2.

Also the inflator 36A of this embodiment has the gas ports 36a around the side circumference at the end thereof. The end is disposed in the first chamber 1 through the inflator openings 16 and 24 (refer to FIG. 9). Also the inflator 36A emits a jet of gas radially from the gas ports 36a. However, the gas ports 36*a* and the communication holes 27 of this embodiment are out of phase relative to the center of the airbag; the communication holes 27 are not on the extension in the gas-emitting direction of the gas ports 36*a*.

The other structures of the inflator 36A are the same as those of the airbag system of FIGS. 1 and 2.

The guide member 60 includes a substantially ring-shaped enclosure wall 61 that encloses the side circumference of the end of the inflator 36A, a top plate 62 that closes the front end (the occupant side) of the enclosure wall 61, gas discharge ports 63 provided in the enclosure wall 61, a ferrule 64 disposed around the rear end of the enclosure wall 61, and stud bolts 65 projecting backwardly from the ferrule 64. The space enclosed by the enclosure wall 61 and the top plate 62 serves as a gas receiving chamber 66 for receiving the gas from the inflator 36A. The gas discharge ports 63 are spaced equidistantly around the enclosure wall 61, through which the gas in the gas receiving chamber 66 flows out radially.

The guide member 60 is fixed to the retainer 30 together with the second inner panel 22B, the rear panel 14, and the inflator 36A in such a way that the ferrule 64 is superposed on the periphery of the inflator opening 24 of the second inner panel 22B from within the first chamber 1 and the stud bolts 65 are passed through the respective bolt-insertion holes of the second inner panel 22B, the rear panel 14, the retainer 30, and the flange 38 of the inflator 36A, on the ends of which nuts 46 are fastened. In that case, the end of the inflator 36A is disposed in the gas receiving chamber 66 through the respective inflator openings of the retainer 30, the rear panel 14, and the second inner panel 22B.

In this embodiment, the guide member 60 is disposed in such a manner that the communication holes 27 are placed on the extension of the gas-discharging direction of part of the gas discharge ports 63 and the panel portion of the second inner panel 22B is placed on the extension of the gas-discharging direction of the remaining gas discharge ports 63, with the airbag 10 in an inflated state.

The guide member 60 is made of metal or heat-resistant synthetic resin; however, it is not limited to that.

The other structures of the airbag system are the same as those of the airbag system of FIGS. 1 and 2.

In this airbag system, when the inflator 36A is activated in the event of a car crash etc., a jet of gas is emitted from the inflator 36A into the gas receiving chamber 66 of the guide member 60 and then flows from the gas receiving chamber 66 into the first chamber 1 of the airbag 10 through the gas discharge ports 63. At that time, the gas is directly supplied also into the second chamber 2 through the communication holes 27, because the gas flows into the communication holes 27 through part of the gas discharge ports 63. Thus, the second chamber 2 inflates early. The gas that flows out from the remaining gas discharge ports 63 strikes against the panel portion of the second inner panel 22B and so remains principally in the first chamber 1. Thus, also the first chamber 1 inflates early.

With the airbag system, the gas from the inflator 36A can be introduced into the communication holes 27 by the guide member 60, so that the gas can be supplied also to the second chamber 2, even when the communication holes 27 for communicating the first chamber 1 and the second chamber 2 with each other are not disposed on the extension of the gas-emitting direction of the gas ports 36*a* of the inflator 36A.

Figure 10:
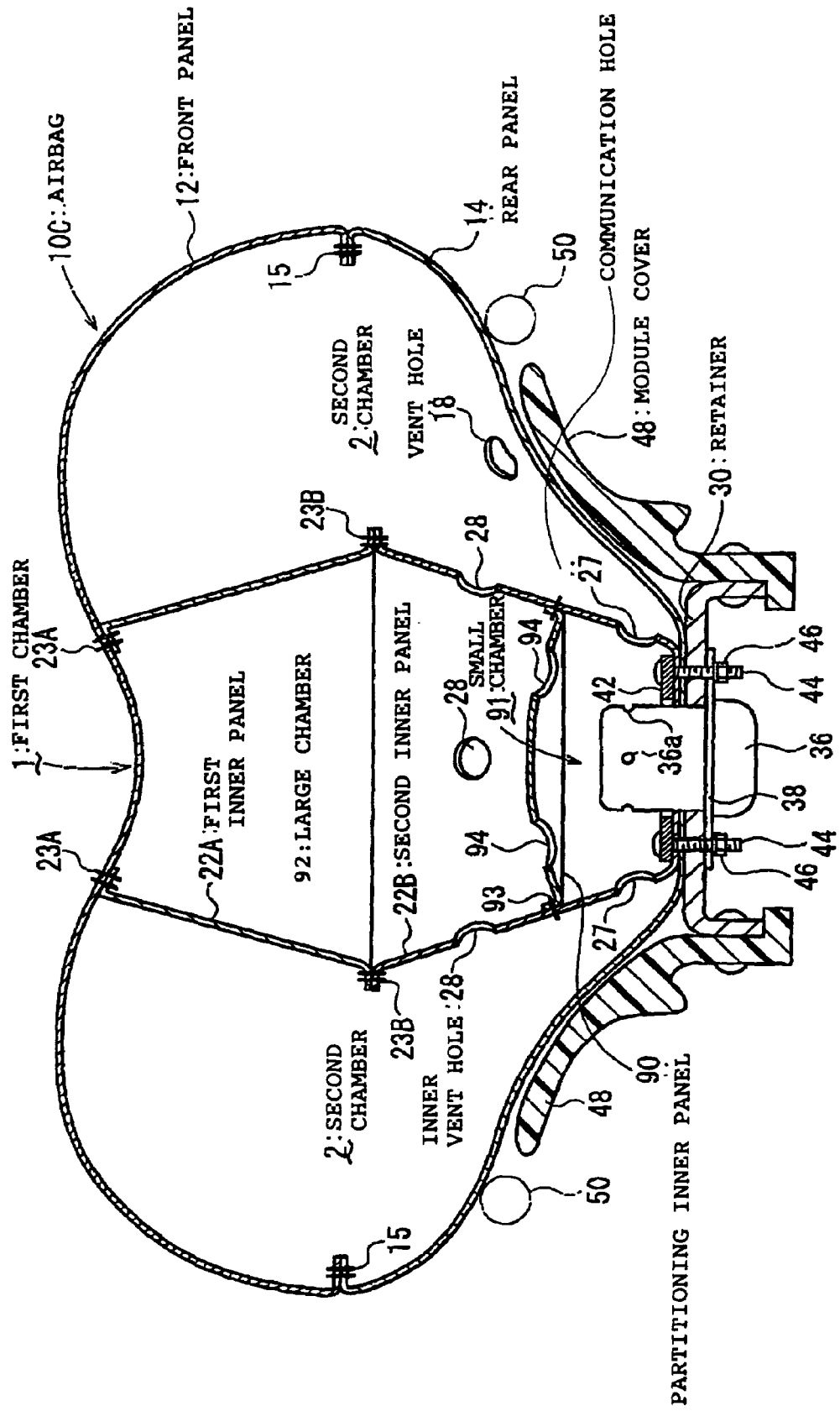
FIG. 10 is a cross sectional view of an airbag system according to another embodiment.

FIG. 10 is a cross sectional view of an airbag system 10C, showing another example of the guide member.

In this embodiment, the interior of the first chamber 1 of the airbag 10C is partitioned by a partitioning inner panel 90 serving as a guide member into a small chamber 91 adjacent to the inflator 36 and a large chamber 92 adjacent to the front panel 12. The airbag 10C has the same structure as the airbag 10 of FIGS. 1 and 2, except that the partitioning inner panel 90 is provided.

The partitioning inner panel 90 of this embodiment is made of a circular woven fabric and disposed inside the second inner panel 22B (inside the first chamber 1), at the identical point with the second inner panel 22B, the periphery of which is sewn on the midpoint between the inner periphery (adjacent to the inflator opening 24) and the outer periphery of the second inner panel 22B with a seam 93. As shown in the drawing, in this embodiment, the inner vent holes 28 are disposed closer to the outer periphery of the second inner panel 22B;, while the communication holes 27 for the second chamber 2 are disposed closer to the inner periphery. The periphery of the partitioning inner panel 90 is sewn on the portion between the inner vent holes 28 and the communication holes 27.

Of the first chamber 1, the small chamber 91 is formed between the partitioning inner panel 90 and the inflator 36, while the large chamber 92 is formed between the partitioning inner panel 90 and the front panel 12. The communication holes 27 face the small chamber 91, while the inner vent holes 28 face the large chamber 92.

The partitioning inner panel 90 has gas discharge openings 94 for discharging gas from the small chamber 91 into the large chamber 92. The shape, arrangement, opening area of the gas discharge openings 94 are selected depending on the internal volume of the large chamber 92 and are not particularly limited.

In an airbag system including the airbag 10C with such a structure, when the inflator 36 emits a jet of gas in a car crash, the gas from the inflator 36 is first introduced into the small chamber 91, from which the gas is distributed into the large chamber 92 and the second chamber 2 through the gas discharge openings 94 and the communication holes 27, respectively. Thus, both of the large chamber 92 (first chamber 1) and the second chamber 2 inflate early.

Figure 11:
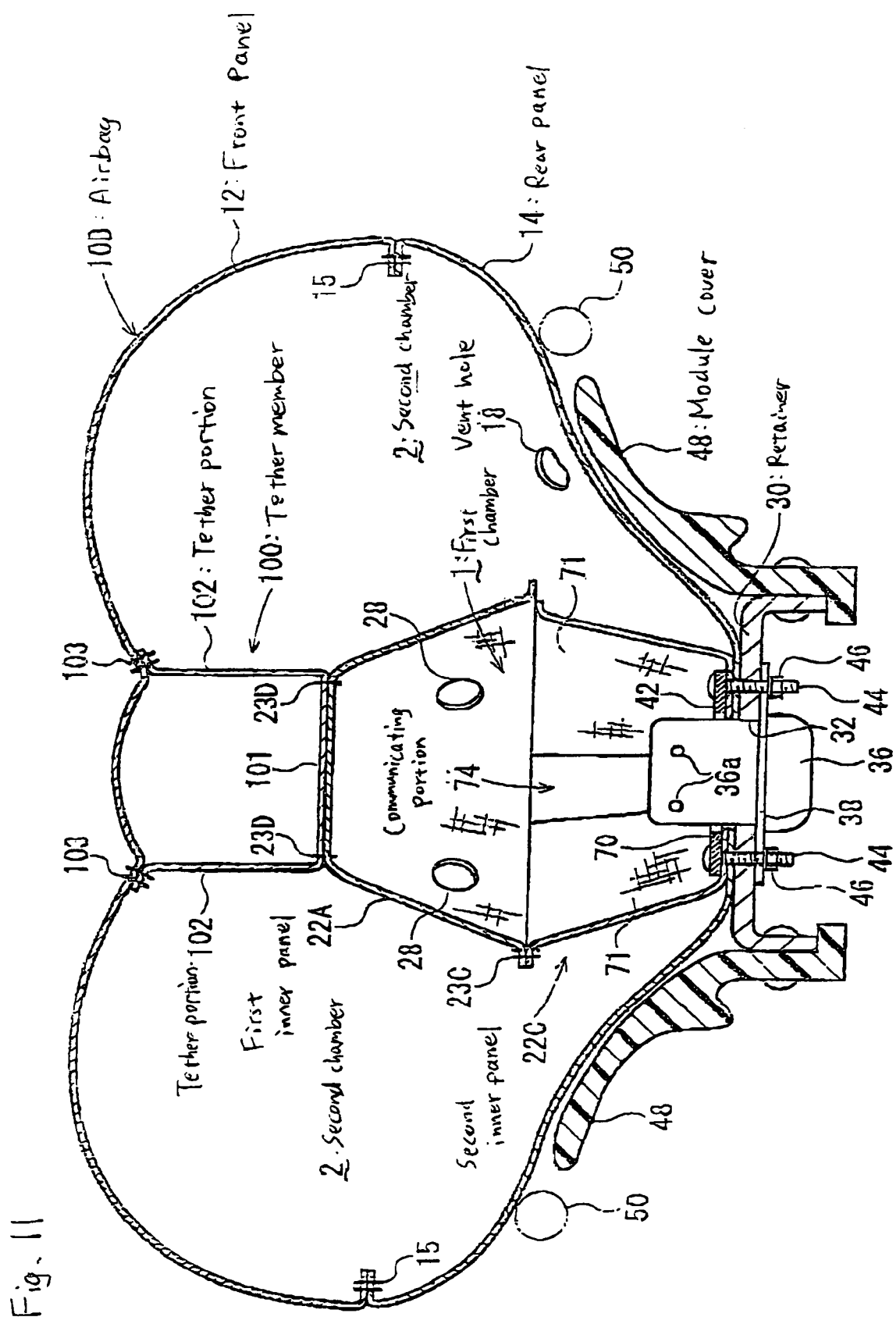
FIG. 11 is a cross sectional view of an airbag system according to another embodiment.

FIG. 11 is a cross sectional view of an airbag and an airbag system according to another embodiment. FIG. 12 is an exploded perspective view of the airbag and airbag system.

In the airbag 10D of this embodiment, the first inner panel 22A in the airbag 10D is connected to the front panel 12 comprising a side facing the occupant of the airbag 10D via a tether member 100.

In this embodiment, the tether member 100 has a base portion 101 sewn at the central portion of the first inner panel 22A (the end portion adjacent to the occupant of the first inner panel 22A in the inflated state of the airbag 10D) and two tether portions 102 and 102 being strap-shaped or belt-shaped and projecting from the base portion 101. As shown in FIG. 12, the base portion 101 is made of a circular woven fabric, of which the diameter is smaller than that of the first inner panel 22A. The base portion 101 is centered at the identical point with the first inner panel 22A on the occupant side, of which the outer periphery is stitched together to the first inner panel 22A with a seam 23D.

Each tether portion 102 is connected to the outer periphery of the base portion 101 at one end, and stitched together to the front panel 12 near the center portion with a seam 103 at the other end. In this embodiment, as shown in FIG. 12, these two tether portion 102 and 102 are disposed across the center of the base portion 101 from each other.

However, the construction of the tether 100 is not limited to this; the tether portion 102 may be provided with one or more than three tether portions. The tether portion 102 may be panel-shaped or tubular. The tether portion 102 may be provided separately from the base portion 101. The tether portion 102 may be directly connected to the first inner panel 22A at the one end with the base portion 101 omitted.

The other structures of the airbag 10D are the same as those of the airbag 10B in FIGS. 4 and 5. The same reference numerals in FIGS. 11 and 12 as those of FIGS. 4 and 5 denote the same components.

In the airbag 10D, the first inner panel 22A is connected to the front panel 12 via the tether portion 102. This facilitates the adjustment of the thickness of the inflated airbag 10D by adjusting the length of the tether portion 102.

The embodiment of the FIGS. 11 and 12 shows the connecting structure of the first inner panel 22A and the front panel 12 in the embodiment of FIG. 4 and 5 by the tether member 100. As well as this, the inner panel 22A, 22D and 22E in the other embodiments described above can be connected to the front panel 12 via a tether member. However, drawings of these connecting structures are omitted.

The above-described embodiments are merely examples of the invention; the invention is not limited to the embodiments.

In the above embodiments, the periphery of the inflator opening of the second inner panel is retained to the periphery of the inflator opening of the rear panel with a ferrule. However, the periphery of the inflator opening of the second inner panel may be sewn on the periphery of the inflator opening of the rear panel. Thus, the peripheries of the inflator openings are reinforced by each other. Alternatively, reinforcement patch cloth may be attached to the peripheries of the openings.

What is claimed is:

1. An airbag for being inflated by gas from a gas generator, the airbag comprising:
    an inner chamber in which gas from the gas generator is emitted and flows in a predetermined direction;
    an outer chamber in which the inner chamber is disposed;
    at least one communication opening between the inner and outer chambers that is aligned with the predetermined gas flow direction so that gas travels through the inner chamber and the at least one communication opening into the outer chamber along the predetermined gas flow direction for rapid inflation of the outer chamber;
    an outer wall extending about the outer chamber and having a front portion for being engaged by a vehicle occupant;
    a rear, inner panel for being operatively connected to the outer wall adjacent the gas generator; and
    a front, inner panel having an annular configuration and an outer peripheral portion connected to the rear, inner panel to form the inner chamber; and
    a central opening in the front, inner panel with the front, inner panel connected to the outer wall front portion about the central opening.

2. The airbag of claim 1 wherein the predetermined gas flow direction extends linearly from the gas generator in the inner chamber to the communication opening.

3. The airbag of claim 1 wherein the inner chamber includes a gas guide member having at least one gas port aligned with the at least one communication opening such that gas from the gas generator is directed in the predetermined gas flow direction by the gas guide member.

4. The airbag of claim 1 wherein the at least one communication opening is an orifice in the rear, inner panel.

5. The airbag of claim 1 wherein the at least one communication opening comprises a slot opening.

6. The airbag of claim 1 wherein the inner chamber includes a pair of subchambers with gas from the gas generator emitted in one of the subchambers and the at least one communication opening being between the one subchamber and the outer chamber.

7. The airbag of claim 6 wherein the inner chamber includes an apertured partition member that forms the subchambers of the inner chamber.

8. The airbag of claim 1 wherein the inner and outer chambers include at least one tether extending therebetween to interconnect the chambers for controlling airbag expansion in a predetermined expansion direction.

9. The airbag of claim 1 wherein the inner chamber includes at least one vent opening that is spaced further from the gas generator than the at least one communication opening.

10. The airbag of claim 1 wherein the outer wall of the outer chamber includes a second pair of connected panels with one of the panels of the inner chamber being operatively connected to one of the panels of the outer chamber, and the other of the inner chamber panels being operatively connected to the other of the outer chamber panels, and the at least one communication opening being formed by at least one of the inner chamber panels.

11. The airbag of claim 1 in combination with the gas generator which has an annular portion in the airbag inner chamber and that includes a plurality of gas ports at predetermined, spaced circumferential positions about the annular portion, and the at least one communication opening comprises a plurality of communication openings each radially aligned with one of the gas ports so that the predetermined gas flow direction is a linear, radial gas flow direction between corresponding communication openings and gas ports in the gas generator annular portion.

* * * * *